(No Model.)

G. B. SANBORN.
SPLIT PULLEY.

No. 275,947. Patented Apr. 17, 1883.

WITNESSES:
Theo. G. Hoster
C. Sedgwick

INVENTOR:
G. B. Sanborn
BY
ATTORNEYS.

UNITED STATES PATENT OFFICE.

GUSTAVUS B. SANBORN, OF BRISTOL, NEW HAMPSHIRE.

SPLIT PULLEY.

SPECIFICATION forming part of Letters Patent No. 275,947, dated April 17, 1883.

Application filed December 29, 1882. (No model.)

*To all whom it may concern:*

Be it known that I, GUSTAVUS B. SANBORN, of Bristol, in the county of Grafton and State of New Hampshire, have invented certain new and useful Improvements in Split Pulleys, of which the following is a full, clear, and exact description.

This invention relates to split pulleys made of wood, or mainly so, such as are used on shafting for driving machinery, and which are split or made in separate sections or halves to provide for putting them on or taking them off their shaft laterally relatively to the shaft, whereby they may be hung or removed without disturbing the shaft and without interfering with other pulleys or devices on the shaft or the hangers carrying the shaft. Such split wooden pulleys are ordinarily made by constructing them in halves transversely in a straight line or course and making the meeting surfaces of their sections perfectly true and doweling them together. This mode of construction very materially enhances the cost of such pulleys over or as compared with solid pulleys, and makes them inferior as regards strength.

My invention consists in a split wooden pulley which is made from a solid pulley divided into sections in a serpentine or irregular course to fit them on the shaft from opposite sides, and after securing such sections together turning them in common to secure the proper shape, size, and truth to the pulley. Thus constructed the pulley-sections will come together with a perfect fit after each separation of them, and will not wear and work loose when united. The serpentine cut by which the pulley is divided into separate sections is arbitrary and may be greatly varied, nor need the pulley-sections be of equal size.

The invention also consists in one or more further divisions of the pulley, whereby the serpentine cut does not extend through the whole thickness of the pulley, but is diverted, breaking the joint between the pulley-sections, also whereby a V-shaped fit of said sections together is obtained, thus giving increased strength and stability to the pulley.

Reference is to be had to the accompanying drawings, forming part of this specification, in which similar letters of reference indicate corresponding parts in all the figures.

Figure 1:
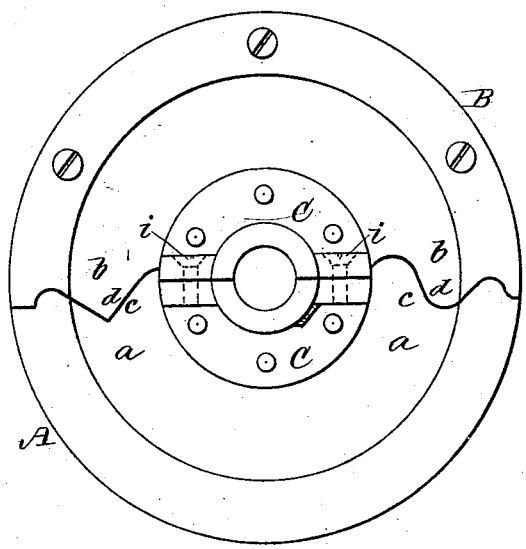
Figure 2:
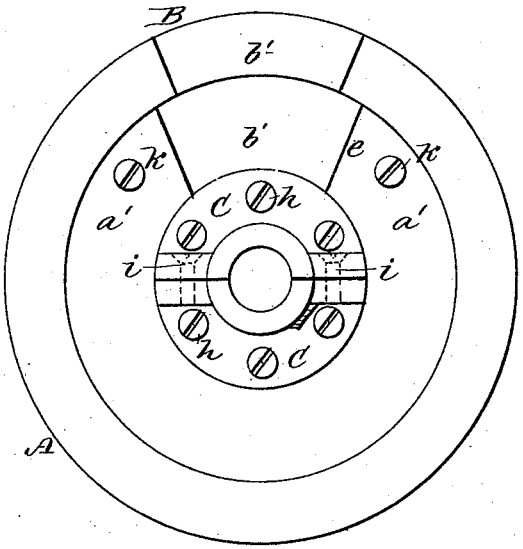
Figure 3:
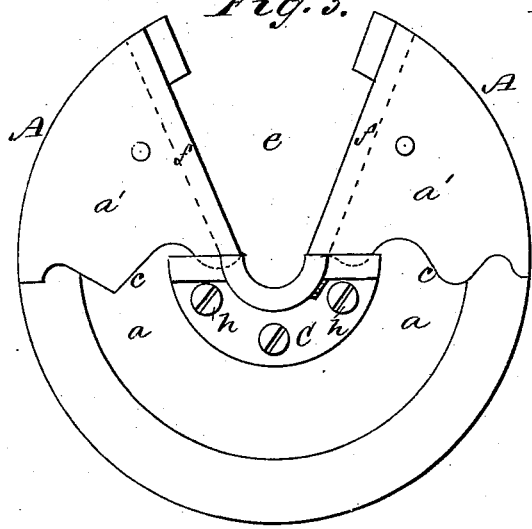
Figure 4:
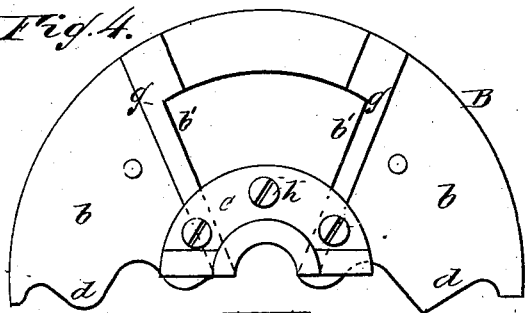
Figure 6:
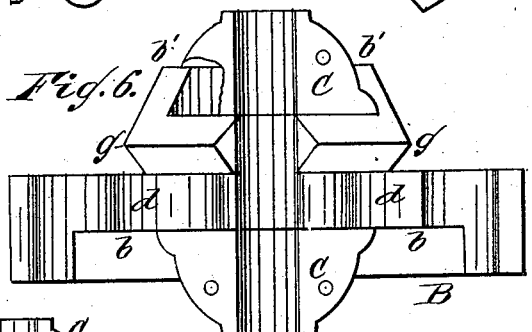
Figure 5:
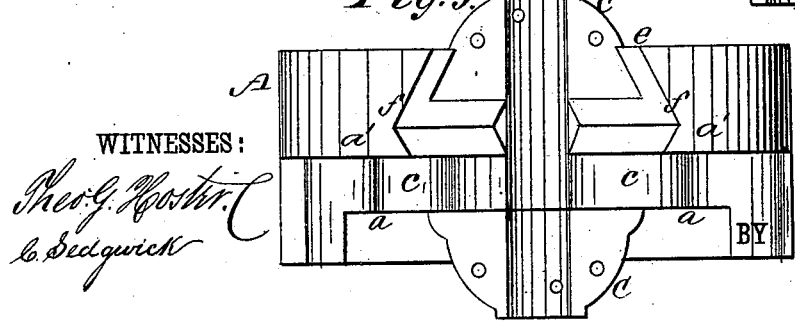

Figures 1 and 2 represent a split wooden pulley, as viewed from opposite sides, constructed in accordance with my invention. Fig. 3 is a face view of one section of the pulley with its other section removed, and Fig. 4 an opposite or inside face view of said removed section. Fig. 5 is a view at right angles to Fig. 4 from its serpentine meeting surface of the section illustrated in Fig. 3, and Fig. 6 is a like view of the pulley-section shown in Fig. 4.

A in the drawings represents the one section of the wooden pulley, and B the other section thereof. These sections may be made from a solid pulley variously cut and built up of several pieces—as, for instance, the section A may have its one portion, $a\, a$, and the portion $b\, b$ of the section B made to constitute a single piece or structure and the same be divided by a serpentine cut through the instrumentality of a band-saw transversely of the pulley through the center of the shaft-hole, forming two serpentine meeting surfaces, $c\, d$, which extend only for a given distance through the thickness of the pulley. The remaining portion $a'\, a'$ of the section A receives the portion, $a\, a$, as an inside facial projection on it, and forms a set-off to receive upon it the portion $b'\, b'$ of the section B in such a manner that the serpentine surfaces $c\, d$ of the two sections will interlock. The section A, as thus formed of the two portions $a\, a$ and $a'\, a'$, has a V-shaped opening, $e$, cut out of the portion $a'\, a'$ of it from what corresponds with the rim of the pulley to the outside of the shaft-hole in the center of the pulley, and the opposite sides of said opening have V-cuts $f\, f$ made down or within them. The other section, B, has a projecting piece or portion, $b'\, b'$, on the inside face of the portion $b\, b$, extending from the rim of the pulley to the shaft-hole and of corresponding V shape in direction of its length and on its sides $g\, g$ to fit snugly in and interlock with the V-shaped opening $e$ and V-recessed sides $f\, f$ of the portion $a'\, a'$ of the section A. The united thicknesses of the portions $b\, b$ and $b'\, b'$ of the section B, and the united thicknesses of the portions $a\, a$ and $a'\, a'$ of the section A correspond respectively with the required thickness of the pulley, which has not only the serpentine transverse division as formed by the meeting surfaces $c\, d$, but a division at right angles thereto as formed by the meeting joint of the portion b b of the section B on the set-off portion a' a' of the section A, and the further V-shaped division as formed by the fit of the portion b' b' in the opening e in the section A. Bolts or screws may be used to secure the portions a a and a' a' of the section A and the portions b b and b' b' together, respectively, so that the pulley is virtually made up of but two sections, A and B, and upon removing either of said sections from each other in a lateral direction relatively to the longitudinal axis of the pulley, sliding the portion b' b' out of the opening e, the pulley may be removed from its shaft and may be similarly replaced sidewise thereon without interfering with other pulleys or devices on the shaft or with its hangers.

Each pulley-section A B has on its outside, at its center, a half-box or flange, C, on both sides of it, the same, when brought together, forming a split hub on both sides of the pulley. These half-boxes are firmly secured by bolts or screws h to their respective portions and to each other on the same side of the pulley by bolts or screws i, or said half-hubs may be formed of or out of the same portion or piece of the pulley-section from which they project, and the bolts or screws h may be used to connect the pulley-sections together, and other bolts or screws, k, also be used for the same purpose. The invention, however, is not restricted to any particular arrangement or number of bolts or screw-fastenings for uniting the pulley-sections so long as they may be conveniently reached when removing or fitting the pulley-sections to or from their places on the shaft. It will be necessary, however, when the half box or hub C, which is on the outside of the portion b' b', is secured by bolts or screws to said portion of the pulley-section B and to the section A to make said half-hub detachable, in order that the pulley-sections may be separated and put together, as described.

The fit of the pulley-sections together, it will be observed, is such that they will always readily come together again after being taken apart, and it will only be necessary to remove a few bolts or screws to take them apart.

The various cuts or divisions made in different directions, as described, serve to give increased strength to the pulley, and the interlocking of the pulley-sections effectually prevents all rattle, shake, and wear, and makes the pulley almost equal to a solid or undivided one, which can only be put endwise on the shaft.

For some pulleys, especially light ones, in which less strength is required, the cuts or divisions may be fewer—that is to say, the fit of a V-shaped portion, b' b', of the one section in a corresponding-shaped opening in the other section may be omitted and other changes be made, according to the description of pulley or work it has to do; but in every case the serpentine division of the pulley-sections will be preserved.

The pulley may have any desired facial configuration given it by turning, and be turned perfectly true after its sections have been fitted together for the purpose.

Having thus fully described my invention, I claim as new and desire to secure by Letters Patent—

1. A transversely divided or split pulley having its sections constructed on their meeting surfaces to form a serpentine or zigzag joint, and to receive the shaft which carries the pulley in between them, substantially as specified.

2. A split pulley transversely divided through the center of its shaft-opening into sections having serpentine meeting surfaces in said direction for a portion only of the thickness or width of the pulley, and constructed and fitted to break or divert the joint so formed by a further division in an outward direction from said shaft-opening on one side thereof, with or without a tongue and groove or V-shaped fit of the pulley-sections together, substantially as specified.

3. The pulley-section A, constructed with a transverse serpentine meeting surface, c, intersecting the shaft-opening, and with a set back or off portion, a' a', in combination with the pulley-section B, having a transverse meeting surface, d, and constructed to fit or lap upon the set-off portion a' a' of the section A, essentially as shown and described.

4. The pulley-section B, constructed with a transverse meeting surface, d, intersecting the opening for the shaft, and with a facial wedge or V-shaped portion, b', in combination with the pulley-section A, having a transverse meeting surface, c, and a set-off portion, a' a', provided with an opening, e, for the reception and fit by a V or tongue-and-groove joint, f g, of the portion b' of the pulley-section B within it, substantially as specified.

GUSTAVUS B. SANBORN.

Witnesses:
 IRA A. CHASE,
 LEWIS W. FLING.